United States Patent
Celiesius et al.

(10) Patent No.: US 12,531,930 B2
(45) Date of Patent: Jan. 20, 2026

(54) USING COMPROMISED EXIT IP ADDRESSES IN IDENTIFYING OPTIMAL VPN SERVERS

(71) Applicant: UAB 360 IT, Vilnius (LT)

(72) Inventors: Kazimieras Celiesius, Vilnius (LT); Mindaugas Valkaitis, Vilnius (LT); Jovaldas Januskevicius, Kaunas (LT)

(73) Assignee: UAB 360 IT, Vilnius (LT)

( * ) Notice: Subject to any disclaimer, the term of this patent is extended or adjusted under 35 U.S.C. 154(b) by 260 days.

(21) Appl. No.: 18/364,407

(22) Filed: Aug. 2, 2023

(65) Prior Publication Data

US 2024/0022637 A1     Jan. 18, 2024

Related U.S. Application Data

(63) Continuation of application No. 17/649,676, filed on Feb. 1, 2022, now Pat. No. 11,758,001, which is a continuation-in-part of application No. 17/126,012, filed on Dec. 17, 2020, now Pat. No. 11,245,670.

(51) Int. Cl.
| | |
|---|---|
| *H04L 12/46* | (2006.01) |
| *H04L 9/40* | (2022.01) |
| *H04L 67/141* | (2022.01) |

(52) U.S. Cl.
CPC ........ *H04L 67/141* (2013.01); *H04L 12/4641* (2013.01); *H04L 63/0272* (2013.01); *H04L 63/1441* (2013.01)

(58) Field of Classification Search
CPC ............. H04L 12/4641; H04L 63/0272; H04L 63/1441; H04L 67/141; H04L 12/4633; H04L 63/0876; H04L 67/1008

See application file for complete search history.

(56) References Cited

U.S. PATENT DOCUMENTS

| | | | |
|---|---|---|---|
| 7,849,505 B2 | 12/2010 | Satterlee et al. | |
| 9,749,837 B2 | 8/2017 | Narkar et al. | |
| 10,021,175 B2 | 7/2018 | Shattil | |
| 10,374,953 B1 | 8/2019 | Branch et al. | |
| 10,440,058 B2 | 10/2019 | Chen | |
| 10,666,543 B2 | 5/2020 | Ratica | |
| 11,245,670 B1 | 2/2022 | Celiesius et al. | |
| 11,297,038 B1 * | 4/2022 | Kolaitis | H04L 61/5061 |
| 11,799,834 B2 | 10/2023 | Celiesius et al. | |
| 2003/0079154 A1 | 4/2003 | Park et al. | |
| 2008/0046995 A1 | 2/2008 | Satterlee et al. | |
| 2009/0193146 A1 | 7/2009 | Albert et al. | |
| 2011/0119370 A1 | 5/2011 | Huang et al. | |

(Continued)

FOREIGN PATENT DOCUMENTS

EP     2852125 B1     5/2018

*Primary Examiner* — Jason D Recek
(74) *Attorney, Agent, or Firm* — Young Basile Hanlon & MacFarlane, P.C.

(57) ABSTRACT

A request is received from a user device. In response to the request, respective penalty scores for VPN servers are calculated. At least some of the VPN servers are associated with respective exit internet protocol (IP) addresses. A respective penalty score for a VPN server is calculated based on a ratio of the respective exit IP addresses determined as being compromised. One or more of the VPN servers are selected based on the respective penalty scores. Respective IP addresses of the one or more of the VPN servers are transmitted to the user device.

20 Claims, 4 Drawing Sheets

(56) References Cited

U.S. PATENT DOCUMENTS

| | | |
|---|---|---|
| 2013/0073744 A1 | 3/2013 | Ratica |
| 2014/0230044 A1 | 8/2014 | Liu et al. |
| 2016/0255140 A1 | 9/2016 | Shattil |
| 2017/0300716 A1 | 10/2017 | Reisgies |
| 2017/0366395 A1 | 12/2017 | Goldfarb et al. |
| 2018/0176221 A1 | 6/2018 | Zhou et al. |
| 2018/0309834 A1 | 10/2018 | Nitta et al. |
| 2018/0331973 A1 | 11/2018 | Mani et al. |
| 2021/0342175 A1 | 11/2021 | Lefurgy et al. |
| 2021/0385085 A1 | 12/2021 | Wang et al. |

\* cited by examiner

USING COMPROMISED EXIT IP ADDRESSES IN IDENTIFYING OPTIMAL VPN SERVERS

CROSS REFERENCES TO RELATED APPLICATIONS

This application is a continuation of U.S. patent application Ser. No. 17/649,676, filed Feb. 1, 2022, which is a continuation-in-part of U.S. patent application Ser. No. 17/126,012, files Dec. 17, 2020, the entire disclosures of which are incorporated herein by reference.

FIELD

The present invention relates generally to virtual private networks (VPN), and more particularly to identifying optimal servers in a VPN.

BACKGROUND

Global Internet users increasingly rely on virtual private network (VPN) services to preserve their privacy, circumvent censorship, and access geo filtered content. Originally developed as a technology to privately send and receive data across public networks, VPNs are now used broadly as a privacy-preserving technology that allows Internet users to obscure not only their traffic but also their personal information, such as their web browsing history, from third parties including Internet service providers (ISPs) and Spywares, etc. A VPN service provider offers a secure private networking environment within a shared public insecure infrastructure through encapsulation and encryption of all traffic from the VPN application within the VPN user's device to the remote access VPN server.

Most VPN providers rely on tunneling protocol to create a private network to add a layer of security that protects each packet on its journey over the Internet. Tunneling is the process of placing the entire packet within another packet before it is transported over the internet. The outer packet protects the contents from public view and ensures that the packet moves within a virtual tunnel. This virtual tunnel is a point-to-point tunnel established between the user device and the VPN server. This layering of packets is called encapsulation. Computers or other network devices at both ends of the tunnel. called tunnel interfaces, can encapsulate outgoing packets and reopen incoming packets. Additionally, in a VPN network, devices at each end of the tunnel encrypt the data entering the tunnel and decrypt them at the destination.

Encryption is the process of changing the data from a transparently readable format to an encoded, unreadable format with the help of an encryption algorithm. This encoded format can only be decoded with the right decryption key. VPN encryption, as mentioned before, renders the user's online traffic indecipherable to any third-party monitoring them. At the fundamental level, when a user launches a VPN application and connects to a VPN server, all the subsequent user's requests are encrypted before they are sent to the server. Then they are decrypted by the server and forwarded to the intended target on the Internet. After which the requested data is encrypted when the server receives them and sends the received data back to the user device. Once the data reaches the user device, the data is decrypted by the VPN application so that the user can view them.

VPNs generally use different types of encryption algorithms to encrypt and decrypt user's online traffic. Symmetric encryption is one of the algorithms that rely on the identical public key and private key. This form of encryption is considered relatively fast, and one example of symmetric encryption is the AES encryption cipher. Another type of encryption algorithm is the Asymmetric encryption; it is also known as public key cryptography. This algorithm uses different keys for the encryption and decryption process. An example of asymmetric encryption is the RSA (Rivest-Shamir-Adleman) protocol.

VPN encryption keys are a randomly generated string of bits that is used to encrypt and decrypt data. Each encryption key is generated in such a way that it is unique. The length of an encryption key is calculated in bits, and usually, the longer the key is, the stronger the key encryption. There are two types of encryption keys that are being used—Private key and Public key. They are mathematically related, since any kind of information that is encrypted with a public key can only be decrypted with a private key associated with it. The public key is usually available through a public directory, while the private key remains confidential and is only accessible by the key owner.

When a user accesses a VPN client application, the user is first taken through the procedure of authentication. User authentication is the verification of credentials required for confirmation of a user's authenticity. In other words, authentication is used to prove a user is allowed access, and so provides a form of access control. A typical user authentication consists of verifying a simple ID and password combination. However, more authentication factors are added to improve the security of the VPN user. The primary authentication factors are knowledge, possession and inherence. Knowledge factors include all things a user must know in order to log in to the VPN client application, e.g., usernames or ID, passwords and PINs. In the same way, possession factors consist of anything a user must have in their possession, such as one-time password (OTP) tokens. Finally, the inherence factors include any inherent trait the user has that are confirmed for accessing the VPN client application such as fingerprint scans, retina scans, iris scans, etc.

A typical VPN service consists of a network of servers, typically spread across several geographical locations. VPN server is a physical or a virtual server that is configured to host and deliver VPN services to users worldwide. The server is a combination of hardware and VPN server usually has more logical and physical communication ports. The VPN client application connects with a VPN server and sends the user's traffic to it through an encrypted tunnel. After receiving all the encrypted traffic, the VPN server will decrypt and forward the traffic to the designated web server. As soon as the web server sends the requested data, the VPN server receives and encrypts the data before sending it to the user. The VPN client application will then decrypt the data for the user's view.

A VPN client application is a software-based technology that establishes a secure connection between the user and a VPN server. Some VPN client applications work in the background of the user's device automatically, while others have front-end interfaces that allow users to interact with and configure them. VPN client applications are often installed on a computer, though some organizations provide a purpose-built VPN client application that is a hardware device pre-installed with VPN software. Generally, VPN client applications operate on more than one VPN protocol to encrypt and decrypt the data. Some of the commonly used VPN protocols are OpenVPN, SSTP, PPTP, L2TP/IPSec, IKEv2, SoftEther Most of the VPN services allow users to select or switch between different servers in the private network according to the user's choice of location or requirements. For instance, if a user wants to connect to a VPN server that is located in the US, the user can simply choose the location through the graphic user interface and the connection will be instantly established to the US server. It is also the same when the user wants to switch to a different server in that particular country. The existence of multiple servers in a VPN service network makes it possible for users to choose the location of servers. Without this provision of choice, users generally will be assigned random servers without the ability to choose the servers with certain parameters that they want. The more VPN servers a VPN service provides, the better it is for the users. This is because the users will have more servers to choose, and they can access even the remotest websites that are only available in certain countries.

However, most VPN services do not have an inbuilt system or a method to recommend or identify an optimal server for a particular user from the VPN Servers available. Average users often do not have clarity for identifying and selecting the optimum server to serve their purpose. Therefore, users mostly tend to randomly choose a server in a VPN service provider without weighing the servers' various parameters and conditions. Without evaluating the server conditions, the user is left in ambiguity while choosing a random server. One cannot be assured that all servers in a VPN service can be ideal so, it is important for the VPN service provider to evaluate and recommend servers to users accessing their services. This ensures reliability, connectivity, and improves user experience significantly.

Not all servers in a VPN network are suitable for servicing the user. In some instances, there can be poor connectivity between the chosen server and the user device; there can be occasional lag or other difficulties when connected with a certain server in a VPN network. These impediments in a VPN network are due to various unavoidable factors that tend to affect VPN servers' performance. Therefore, a VPN service provider must analyze and evaluate the server conditions before servicing the user. Moreover, the server conditions can be volatile over time and must be monitored at regular intervals.

For instance, location can be an important condition in evaluating a server for a particular connection request. If the chosen server is significantly far from the user's actual location, then there are chances of poor connectivity and lower server speed. The reduction in the server speed correlates to how far the connection must travel since chances of packet losses also rise with the longer server distance, which reduces the network speed. Other than location, load of a server can also be another condition in evaluating the servers. A server load is the amount of total server bandwidth currently being used and it directly correlates to the number of users sharing the server at once. Overloading of servers in a VPN network is the most common reason for experiencing lag or poor connectivity. When numerous users are connecting with the same server simultaneously, there is a chance for the particular server to overload with plenty of requests, affecting the server performance. Availability of fewer servers in a given location is one reason for overloading, due to the lack of choice for the users which makes it impossible to distribute the users' request load across multiple VPN servers.

Apart from the distance of a server and overloading, if the chosen VPN server is not located on or not in proximity with an international Internet exchange hub, then there are chances for slower network speed. Servers that are in close proximity to an international Internet exchange hub have significant server speed, and all connections that pass through these exchange hubs are faster. The better speed and connectivity are because of how international Internet cables are laid. For instance, if a user intends to connect with servers in the UK and chooses servers in Manchester over London due to the US's distance proximity, the user may experience lag or reduced server speed. Because London is one of the exchange hubs on the international Internet exchange hub and all connections to Manchester pass through London. Therefore, all connections to London servers tend to be faster compared to other locations that are considerably far away from the international Internet exchange hub. For that reason, it will be beneficial to develop systems and methods to identify servers that are in proximity to an International internet hub so that potential lag and network problems can be avoided.

Several other conditions render specific servers suitable or not so suitable for servicing the user. Therefore, the VPN service provider must develop methods or systems to evaluate conditions pertaining to several VPN Servers to efficiently service their users. Identifying and recommending an optimal server from among the given set of VPN servers can improve server response time, data throughput and overall user experience. To address this issue, the current embodiment provides systems and methods to dynamically evaluate, identify, and connect the user with an optimal server from among a given set of VPN Servers.

SUMMARY

The present embodiment provides systems and methods to effectively identify and service the user's request through an optimal server from among multiple VPN servers. In one aspect, the present embodiment can gather data, compute, analyze and determine several factors and conditions related to multiple VPN servers present in a VPN service provider's infrastructure. The embodiment is able to compute server penalty scores for multiple VPN servers using their corresponding numerical weights. The current embodiment also can calculate numerical weights for each server conditions corresponding to multiple VPN servers.

Another feature of the embodiment includes choosing the optimal VPN server consistently and dynamically from a scored list of VPN servers. The chosen optimal server is then employed to service the user requests effectively. The method includes identifying a VPN server with the lowest penalty score since the lowest penalty score is an indicator of the optimal VPN server. The VPN server with the lowest penalty score is chosen by the embodiment and is able to instruct the VPN client application to establish an encrypted connection between the chosen VPN server and the user device. Furthermore, the embodiment can calculate and determine a small value known as the random value, which is utilized in the computation of server penalty score. The random value is a numerical value which has a range of [0, 0.001]. The seed for calculating this random value can be generated by combining multiple attributes, server conditions, and other properties. The term seed refers to the numerical value that is generated using one or more values. Exemplary combinations for the random value seed may include and not limited to server IDs, Unix time value rounded to the nearest desired interval, client application IDs. The client application ID here refers to a randomly generated number during the installation of the VPN client application in the user device. The purpose of this random value is to ensure that no two servers will have the same server penalty score in a given set of VPN servers.

Another aspect of the current embodiment includes a server picker infrastructure for choosing the optimal VPN server from multiple VPN servers. The server picker infrastructure can dynamically compute and determine server penalty scores for each VPN server. The server picker infrastructure is also configured to gather multiple server conditions for computing server penalty scores. Some examples of gathered information regarding server conditions are server location, hub score, current load, bandwidth, server creation time, server IDs etc. The embodiment includes systems and methods to measure these conditions and determine numerical weights for the multiple server conditions. Another feature of the embodiment is that it includes methods and systems to determine hub scores for multiple VPN servers based on their proximity to the international Internet exchange hub. The hub score is determined and assigned through one of the embodiments and is used to identify the proximity of multiple VPN servers with international Internet exchange hubs. Moreover, the system is configured to regularly measure these conditions and update the server penalty scores for each VPN server.

Another aspect is a method that includes receiving a request for a virtual private network (VPN) server that is an optimal VPN server for a user device; calculating respective penalty scores for VPN servers including the optimal VPN server, where a respective penalty score of a VPN server is calculated based on whether the VPN server is in a same country as the user device and a proximity of the VPN server to an international Internet exchange hub; selecting the optimal VPN server based on the respective penalty scores; and transmitting an internet protocol (IP) address of the optimal VPN server to the user device.

Another aspect is a method that includes receiving a request for a virtual private network (VPN) server that is an optimal VPN server for a user device; calculating respective penalty scores for VPN servers including the optimal VPN server, where a respective penalty score of a VPN server is calculated based on a creation time of the server; selecting the optimal VPN server based on the respective penalty scores; and transmitting an internet protocol (IP) address of the optimal VPN server to the user device.

Another aspect is a device that includes a memory and a processor. The processor is configured to execute instructions stored in the memory to receive a request for a virtual private network (VPN) server that is an optimal VPN server for a user device; calculate respective penalty scores for VPN servers including the optimal VPN server, where a respective penalty score of a VPN server is calculated based on whether the VPN server is in a same country as the user device and a proximity of the VPN server to an international Internet exchange hub; select the optimal VPN server based on the respective penalty scores; and transmit an internet protocol (IP) address of the optimal VPN server to the user device.

DESCRIPTION OF DIAGRAMS

DETAILED DESCRIPTION

Figure 1:
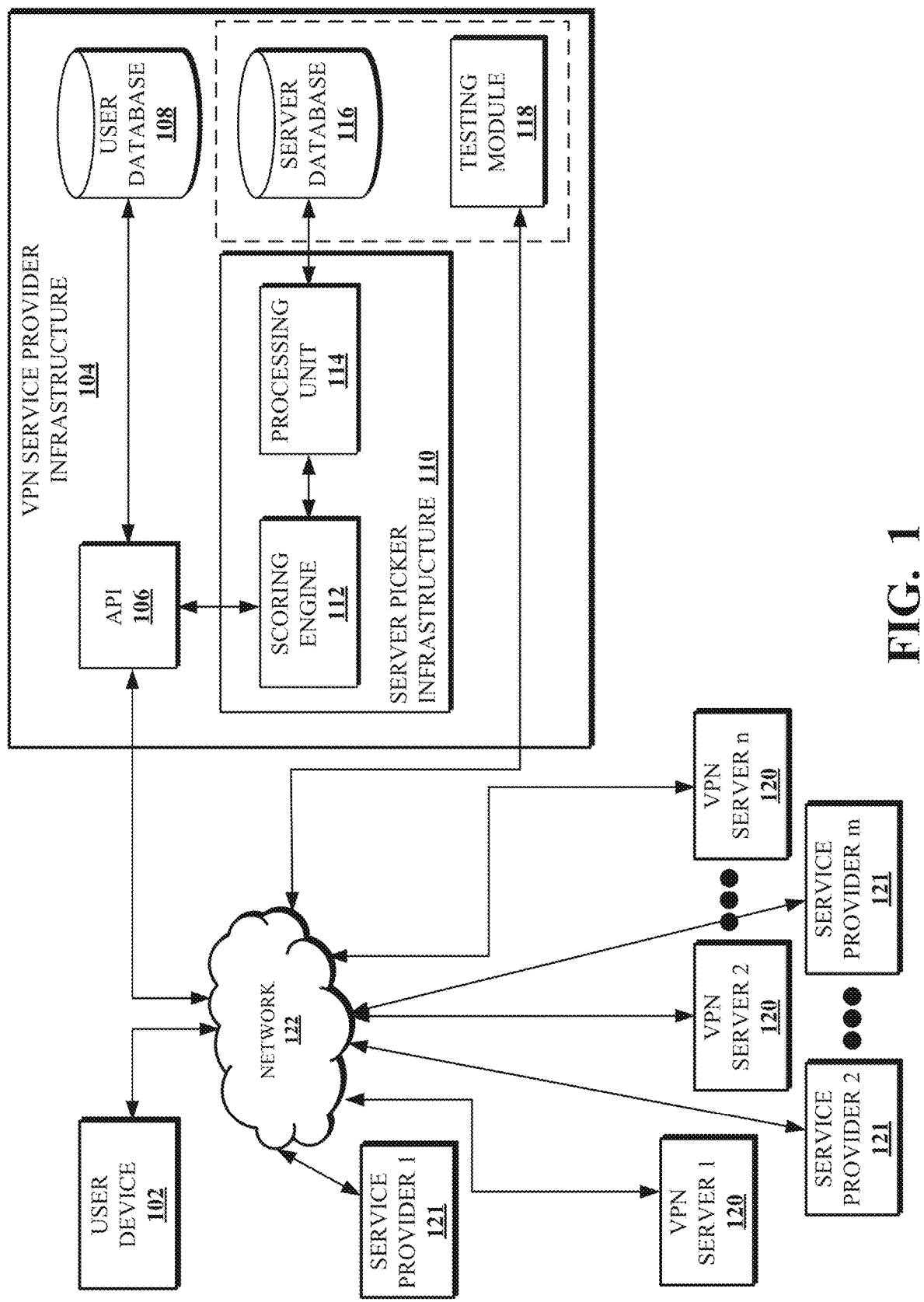
FIG. 1 shows a block diagram of an exemplary architectural depiction of components.

Some general terminology descriptions may be helpful and are included herein for convenience and are intended to be interpreted in the broadest possible interpretation. Elements that are not imperatively defined in the description and should have the meaning as would be understood by the person skilled in the art.

User Device 102—can be any computing device capable of hosting the VPN client application. It can comprise any physical device that is connected to a network, including, for example, a laptop, a mobile phone, a tablet computer, a desktop computer, a smart device, a router and other network devices. User Device 102 can also be a device that is capable of network connectivity, but not primarily intended for networking, such as connected home appliances, smart home security systems, autonomous farming equipment, wearable health monitors, smart factory equipment, wireless inventory trackers, biometric cybersecurity scanners, and others.

VPN Service Provider Infrastructure 104—is a combination of hardware and software that provides functionality for multiple User Devices 102 via the Network 122. VPN Service Provider Infrastructure 104 can receive from the User Device 102 the request to establish a VPN connection and also can forward the IP addresses of the optimal servers along with authentication credentials for the purpose of establishing the encrypted tunnel to the User Device 102. Specifically, VPN Service Provider Infrastructure 104 may contain the Server Picker Infrastructure 110 which is responsible for identifying the optimal server through in-built algorithms and computations. The VPN Service Provider Infrastructure 104 also contains databases, which will persistently store and contain all of the data necessary for servicing the VPN client. In some instances of the embodiment the VPN Service Provider Infrastructure 104 includes the Testing Module 118 that gathers information related to the plurality of VPN Servers 120. VPN service Provider Infrastructure 104 can be a combination of physical devices, virtual machines/servers, or can be located on the cloud.

API 106—where API is an acronym for application programming interface. API 106 is a programming interface consisting of one or more endpoints to a defined request-response message system. In simple terms, API 106 is the interface between the User Device 102 and the VPN Service Provider Infrastructure 104. API 106 is capable of handling the authentication requests from the User Device 102 and also mediating the requests for establishing a VPN connection. API 106 is a constituent of VPN Service Provider Infrastructure 104 and it can request the Server Picker Infrastructure 110 for the IP addresses of optimal VPN servers. It can also send a database query to the User Database 108 in order to authenticate the User Device 102. API 106 can be operating on any hardware or can be based on cloud.

User Database 108—a component of the VPN Service Provider Infrastructure 104 and a structured repository of authentication credentials belonging to the owners of multiple User Devices 102. It stores user related data in tables (named columns and multiple rows), where there is information included regarding the authentication credentials of the owner of User Device 108. It is responsible for verifying credentials of the owner of the User Device 102 and allowing the User Device 102 to connect with the VPN Service Provider Infrastructure 104. User Database 108 can be populated with user profiles continuously and is responsible for authenticating, authorizing multiple User Devices 102. User Database 108 can be any physical storage device or a cloud-based storage.

Server Picker Infrastructure 110—a logical unit and a constituent of the VPN Service Provider Infrastructure 104 that is configured to perform complex operations of identifying the optimal server from among the plurality of VPN Servers 120. Server Picker Infrastructure 110 is capable of querying Server Database 116 for server data which is used for computing server penalty score. It also communicates and provides data to User Device 102 through API 106 concerning the identified optimal server. It is a more complex unit consisting or in combination of Scoring Engine 112 and Processing Unit 114. It can be a combination of software and hardware present within or in combination with the VPN Service Provider Infrastructure 104 but the direction of interactions with VPN Service Provider Infrastructure 104 and its constituents remains unchanged.

Scoring Engine 112—a component within or in combination with the Server Picker Infrastructure 110 that is configured to manage, perform arithmetical and logical operations for calculating the server penalty score for the plurality of VPN Server 120. The Processing Unit 112 can be a combination of software and hardware and is capable of identifying, and returning the IP address of the optimal server to API 106 through a series of analytical operations.

Processing Unit 114—a logical component within or in combination with the Server Picker Infrastructure 110 that is configured to perform complex operations of computing numerical weights of various server conditions. Processing Unit 114 may also contain an internal storage unit at its disposal and can be a combination of hardware and software.

Server Database 116—a component of the VPN Service Provider Infrastructure 104 and a storage unit for storing server conditions collected by the Testing Module 118. Server conditions can include but not limited to location, load, time of creation, hub score, server IDs, etc. of the plurality of VPN Servers 120. Server Database 116 can be a combination of hardware and software or a cloud-based system that offers a database management system.

Testing Module 118—is a processing unit that gathers several information about the plurality of VPN Servers 120 known as the server conditions. Testing Module 118 is capable of performing tests against individual VPN servers 120 in order to gather information related to speed, load, round time, etc. It gathers several information on server conditions and is also capable of determining hub score for the plurality of VPN Servers 120. In some instances of the embodiment, Testing Module 118 and Server Database 116 can be located in a separate system present within or in combination with the VPN Service Provider Infrastructure 104.

VPN Servers; VPN Server 1; VPN Server 2; VPN Server n 120—are exemplary instances of the plurality of VPN Servers. Here, VPN is an acronym for virtual private network. The number of servers in the plurality of VPN Servers 120 are not limited and depend on the VPN network provider's infrastructure. A VPN Server is a physical or virtual server that is provisioned to host and deliver VPN Services to multiple User Devices 102 worldwide. Each of the servers in the plurality of VPN Servers 120 is a combination of VPN hardware and VPN software that allows a VPN client installed on the User Device 102 to connect to a secure private network. VPN Servers 120 usually contains more logical and physical communication ports.

Network 122—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Optimal Server—is a VPN server among the plurality of VPN servers that has the least server penalty score and is chosen by the Server Picker Infrastructure 110 as the optimal one or in other words as the best available server from among the plurality of VPN Servers 120 to establish VPN connection with the User Device 102.

Server penalty score—a numerical indicator that infers the quality and condition of a particular server. The server penalty score is calculated by using numerical weights which are direct numerical representations of various server conditions.

Numerical weights—a numerical representation of multiple server conditions. Numerical weights are calculated through the internal algorithm of the Processing Unit 114 that includes various arithmetic operations and formulae. The internal algorithm here refers to multiple formulary arithmetic operations performed by the Processing Unit 114. Each server condition has its corresponding numerical weights calculated by the Processing Unit 114.

Random value—a numerical value that is calculated by the Scoring Engine 112 using the random value seed. The random value seed refers to the numerical value that is generated using one or more values. For example, server ID, client application ID, Unix time value are some of the exemplary sets of values that are used to generate the seed for calculating the random value.

Unix time format—is a data-time format used to express the number of milliseconds that have elapsed since Jan. 1, 1970 00:00:00. It consists of two layers of encoding in which the first layer encodes a point in time as a scalar real number and the second layer encodes the scalar real number as a sequence of bits or decimal digits.

Hub score—a numerical value determined and assigned to the plurality of VPN Servers 120 by the Testing Module 118. The hub score is determined based on a VPN server's proximity to an international Internet exchange hub. Usually, zero or minimal value indicates that a particular VPN server is considerably closer to an international Internet exchange hub.

International Internet exchange hub—a physical infrastructure through which Internet service providers exchange Internet traffic between their networks. The primary purpose of an international Internet exchange hub is to allow networks to interconnect directly, via the exchange, rather than through one or more third-party networks. The primary advantages of direct interconnection are cost, latency, and bandwidth.

FIG. 1 shows an exemplary overall architecture of the current embodiment that comprises User Device 102, which can be any computing or networking device (e.g., a personal computer, mobile phone, a tablet computer, router, smart home device) having access to a particular network (e.g., Internet) and to a VPN application, a VPN Service Provider Infrastructure 104, plurality of VPN Servers 120. All the mentioned components of the embodiments have access to Network 122 and are able to interact with each other through the same. Here, Network 122 can be any digital telecommunication network that permits several nodes to share and access resources, e.g., local-area network (LAN), wide-area networks (WANs), campus-area networks (CANs), metropolitan-area networks (MANs), home-area networks (HANs), Intranet, Extranet, Internetwork, Internet. The VPN Service Provider Infrastructure 104 consists of the following components: API 106, User Database 108, Server Picker Infrastructure 110, Testing Module 118, and Server Database 116. The Server Picker Infrastructure 110 in turn consist of the following components: Scoring Engine 112 and Processing Unit 114. The VPN Server 1 120, VPN Server 2 120, VPN Server n 120 represents the plurality of VPN Servers present in the VPN network. In other words, each server in the plurality of the VPN Servers 120 is provisioned to perform the same task as any other VPN Server 120, but can be spread out geographically. While the elements shown in FIG. 1 implement the exemplary embodiment, some elements in other embodiments can have different titles or can be combined into a single element instead of two separate elements (for example, Scoring Engine 112 and Processing Unit 114 can be combined into a single hardware, software infrastructure to form a single logical unit. Likewise, Testing Module 118 and Server Database 116 can also be combined into a single hardware, software infrastructure or can be combined into a single unit on a cloud.) However, the functionality of elements and the flow of information between the elements is not impacted generally by such consolidations or combinations. Therefore, FIG. 1 as shown should be exemplary only, and not restrictive or exclusionary of other features, including features discussed in other areas of this disclosure here within.

In FIG. 1, all occurrences of communication between the User Device 102, VPN Service Provider infrastructure 104 and the plurality of VPN servers 120 occur through the Network 122. The instances of communication between User Device 102 and VPN Service Provider Infrastructure 104 include but are not limited to authentication, authorization, data exchange, etc. The communication instances between User Device 102 and the plurality of VPN Servers 120 can happen through an encrypted tunneling protocol provided by the VPN application installed on the User Device 102. The tunneling protocols can include but not limited to PPTP, SSTP, L2TP/IPSec, OpenVPN, SSTP, IKEv2, SSL/TLS, Wireguard.

With reference to FIG. 1, the API 106 receives the User Device's 102 request via the Network 122, and the request can be either an authentication request or a request for the IP address of an optimal server in order to establish a VPN connection. Initially, when the User Device 102 approaches the VPN Service Provider Infrastructure 104, the first request is usually an authentication request. Valid credentials are provided by the User Device 102 for the purpose of authentication, which is then verified by the API 106 by accessing the User Database 108. The API 106 queries the User Database 108 for verifying the credentials provided by the User Device 102 against the data present in the User Database 108. Once the credentials are validated, the API 106 authenticates and authorizes the User Device 102.

After authentication, the User Device 102 requests the API 106 for the IP address of an optimal server in order to establish a VPN connection. To satisfy the request, the API 106 in turn requests the Server Picker Infrastructure 110 for an optimal server. The Server Picker Infrastructure 110 is responsible for identifying the optimal server from the plurality of VPN Servers 120. Through a series of in-built methods and/or systems, the Server Picker Infrastructure 110 is able to identify the optimal server. In particular, the Server Picking Infrastructure identifies an optimal server by calculating server penalty score for the plurality of VPN Servers 120. The server penalty score is based on multiple server conditions obtained through the Testing Module 118. The Scoring Engine 112 proceeds to calculate the server penalty score by using the numerical weights provided by the Processing Unit 114, and the random value for each of the plurality of VPN Servers 120 calculated by the Scoring Engine 112. The random value is a numerical value in the interval [0, 0.001]. Addition of this small value to the server penalty score calculation ensures that each score is different and avoids coincidences of server penalty score values.

The IP addresses of the plurality of VPN Servers 120 are arranged in an ascending order according to their respective server penalty score. The Scoring Engine then identifies the optimal server by choosing the server with the lowest penalty score. After which, the Scoring Engine 112 returns the IP address of the identified optimal server to the API 106. The User Device 102 receives the IP address of the identified optimal server through the API 106, after which the User Device 102 makes a secure connection with the optimal server identified by the Scoring Engine 112. The Scoring Engine 112 and the Processing Unit 114 include respective internal storage unit or an internal memory capable of storing, arranging, and sequencing data.

The Server Database 118 and the User Database 108 can be conventional databases offered by MySQL, MSSQL, NoSQL, object-oriented databases, or any other type or category of databases. Data storage-wise the Server Database 118 can also be a data storage within the memory of a computing device or within a cloud. Server Database 118 is responsible for storing, organizing, and returning data related to the plurality of VPN Servers 120. Similarly, the User Database 108 is responsible for storing, and returning authentication credentials of User Device 102 accessing the VPN Service Provider Infrastructure 104. Information regarding the plurality of VPN Servers 120 are stored in the Server Database for the purpose of penalty score calculation.

All requests from the User Device 102 in the current embodiment are executed through a VPN application installed locally or remotely, launched locally or as a remote application. This VPN application, also called the VPN client, is a software-based technology that establishes a secure connection between the User Device 102 and a VPN Server. VPN applications can include a front-end interface that allows the User Device 102 to interact and configure it. In some cases, a VPN application can be a standalone purpose-built device, or a standard computing or networking device installed and configured with the VPN application software.

Further, in FIG. 1, the Testing Module 118 is responsible for collecting the information related to multiple server conditions including but not limited to geo-location of servers, IP addresses of servers, location of servers with respect to the international internet exchange hub, creation time of servers, load measurements of servers, etc. The Testing Module 118 can determine hub score for each server in the plurality of VPN Servers 120 based on their proximity to the international Internet exchange hub. Hub scores are assigned by the Testing Module 118 and indicates the proximity of a server to the international internet exchange hub. Higher hub score indicates that a server is significantly far from an international Internet exchange hub and vice versa. Furthermore, Testing Module 118 is also able to monitor and measure the load of a particular server at regular time intervals and can update the load measurements in the Server Database 116. All the necessary information regarding the server conditions are populated into the Server Database 116 by the Testing Module 118 which are then later utilized by the Server Picker Infrastructure 110.

The embodiments described herein enable effectively establishing a VPN connection between the User Device 102 and an optimal server from among the plurality of VPN Servers 120. According to an embodiment, an optimal server is identified through producing a list of the plurality of VPN Servers 120 which is arranged according to their server penalty score, beginning with the least score value. The server with the least penalty score value is considered to be the optimal server.

According to an embodiment, the plurality of VPN Servers 120 are constantly updated and rearranged within the suggested list of VPN Servers 120 according to their server penalty scores, with the lowest score value always at the top, enabling a dynamic and effective system and method to identify the optimal server from the list of scored VPN Servers 120.

Another feature of the disclosed embodiments includes computing server penalty score for the plurality of VPN Servers 120. The server penalty score is an indicator of the suitability of a particular server for servicing the User Device 102. First numerical weights for the plurality of VPN Servers 120 are computed based on their server conditions. Multiple server conditions of an individual server are represented numerically through the calculations of numerical weights. Using these numerical weights, the server penalty score for each server present in the plurality of VPN Servers 120 is determined and computed.

Another feature of the current embodiments is that they contain systems and methods to access the Server Database 116 that contains information related to several server conditions gathered by the Testing Module 118. The Server Database 116 and the Testing Module 118 can be either inbuilt or in combination with the current embodiment. The Testing Module present in FIG. 1 of the current embodiment is responsible to gather information relating to several server conditions of the plurality of VPN Servers 120.

Figure 2A:
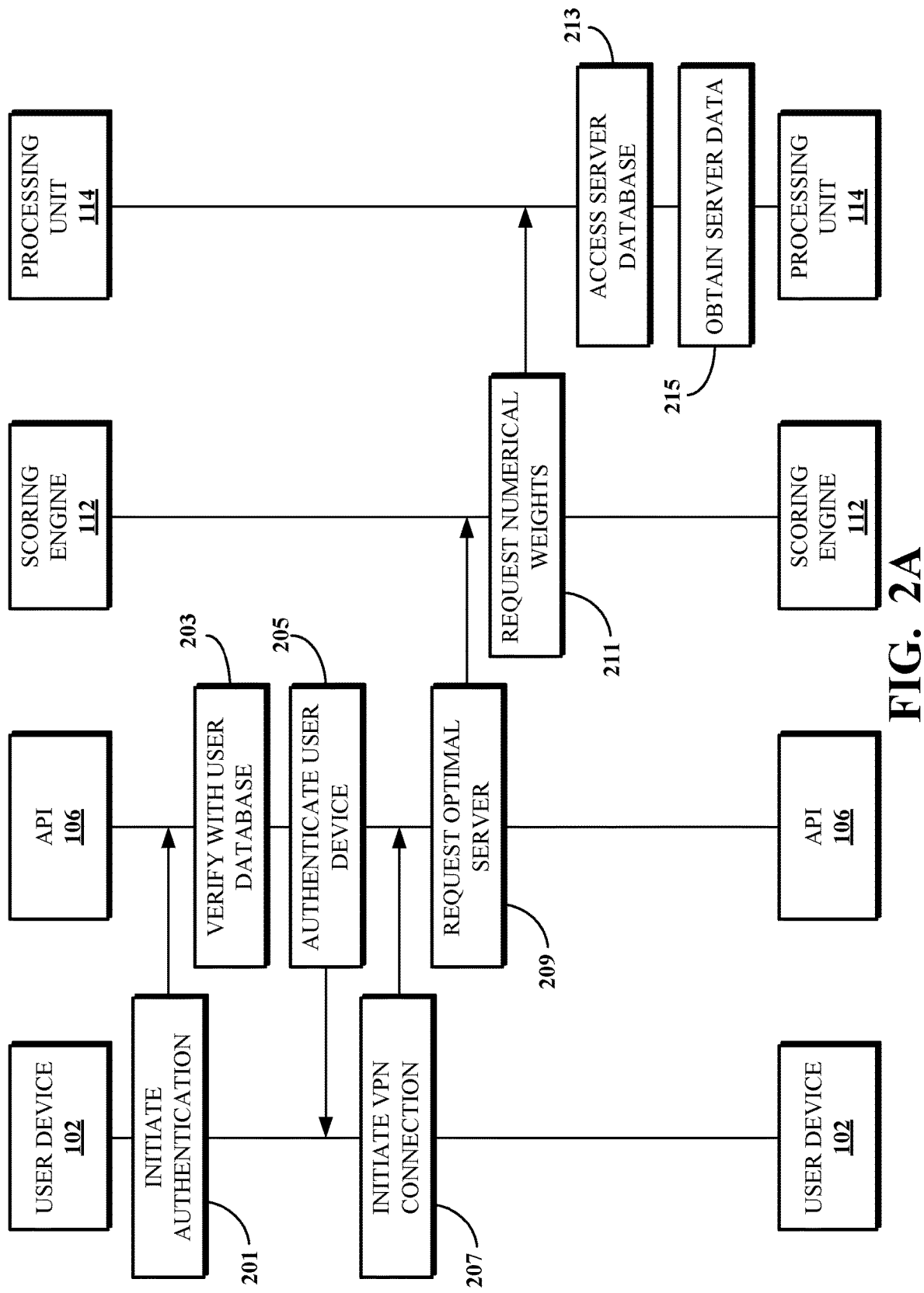
FIG. 2A shows an exemplary flow diagram of the operations of identifying an optimal server.
Figure 2B:
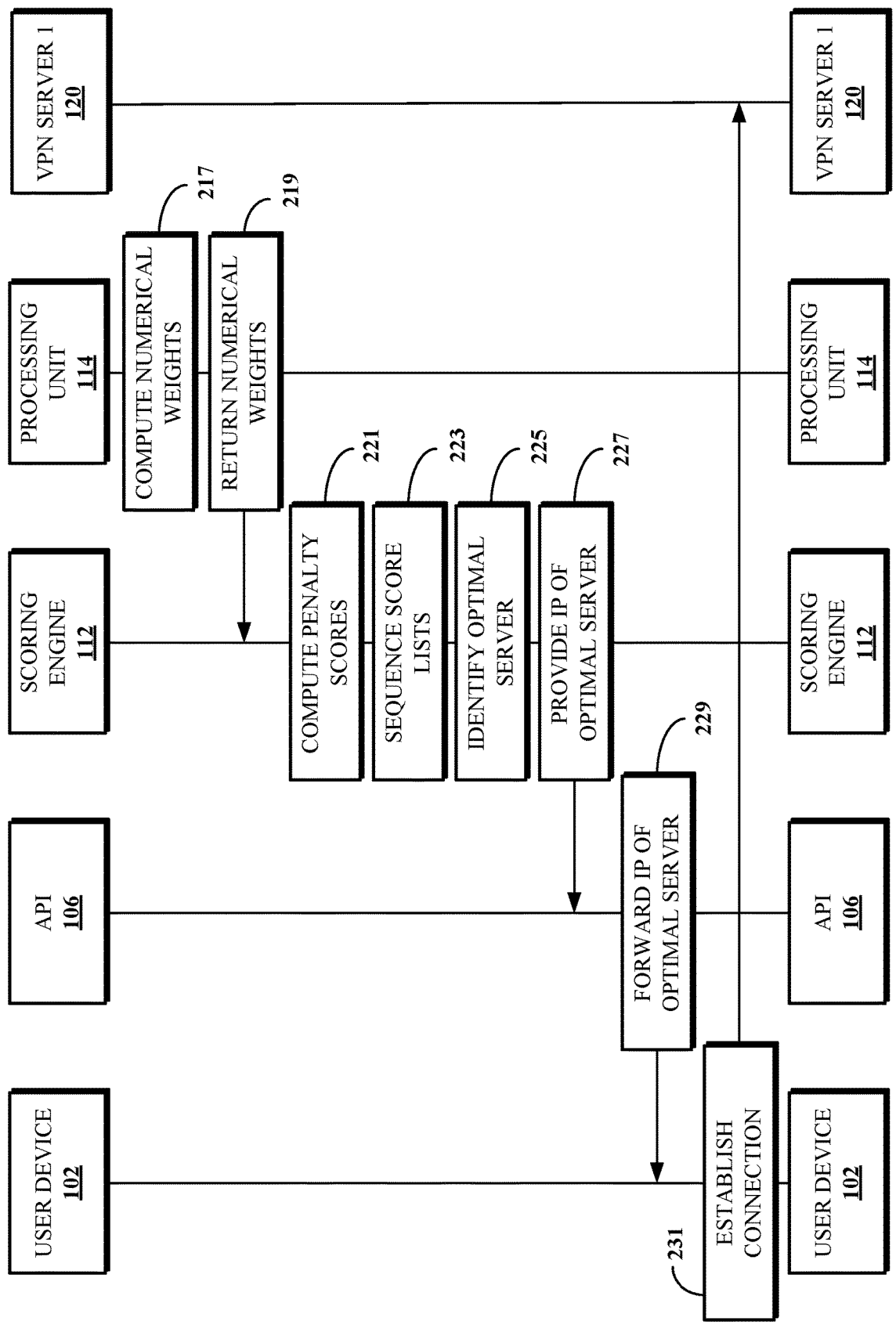
FIG. 2B is a continuation diagram showing an exemplary flow diagram of the operations of identifying an optimal server.

The following figures illustrate the above-mentioned processes and the various embodiments involved with more technical detail. FIGS. 2A and 2B depicts the exemplary flow diagram of the current embodiment. The User Device 102 before accessing the optimal server from among the plurality of VPN servers 102, must authenticate itself with the VPN Service Provider 102. One must note that the process of authentication may not be an exclusive part of the embodiment, but it is a foundational step or in other words an initial procedure to access the services of the current embodiment by the User Device 102.

In step 201, the User Device 102 with the VPN application initiates to authenticate itself with the VPN Service Provider Infrastructure 104 via the Network 122. This request to authenticate is handled by the API 106 of the VPN Service Provider Infrastructure 104 which receives the credentials provided by the User Device 102. The API 106 in step 203, queries the User Database 108 and verifies the credentials provided by the User Device 102 against the data existing in the User Database 108. Once the verification is successful, the API 106 authenticates the User Device 102 in step 205. The authentication process may involve verifying the combination of the user ID and password or PIN provided by the owner of the User Device 102. Verification of OTP (one time password) tokens or biometric traits can also be involved in the process of authentication. The authentication process is important because it enables the VPN Service Provider Infrastructure 104 to keep its networks secure by permitting only authenticated User Devices 102 to access its secured services. Once authenticated, the User Device 102 is usually subjected to an authorization process as well, to determine whether the authenticated User Device 102 should be permitted further access to the VPN Services. The terms authentication and authorization are often used interchangeably. While they may often be implemented together, the two functions are distinct. Authentication is the process of validating the identity of a connecting user behind the User Device 102 before allowing access to the VPN services, whereas authorization on the other hand is the process of validating whether the authenticated User Device 102 has been granted permission to access the requested services. The authentication process is a prerequisite for the authorization process to happen.

After authentication is successful. in step 207 the User Device 102 requests for the IP address of a VPN server to establish a VPN connection. This request for the IP address is received by the API 106 which is responsible for handling such requests. The API 106 in step 209 recognizes this request of the User Device 102 and further requests for the IP address of an optimal server from the Scoring engine 112 of the Server Picker Infrastructure 110.

Responding to the request from API 106, the Scoring Engine 112 begins to calculate the server penalty score for the plurality of VPN servers 120. For this, the Scoring Engine 112 requires numerical weights that are computed by the Processing Unit 114 based on multiple server conditions. In step 211 the Scoring Engine instantaneously requests for numerical weights from the Processing Unit 114. As defined above, the Processing Unit 114 is a logical unit that is capable of performing arithmetical and logical operations in order to calculate the numerical weights. Numerical weights can also be roughly termed as sub scores that are calculated for each server condition by converting them into mathematical expressions. The mathematical expressions and the formulary arithmetic operations used for calculating the numerical weights are collectively termed as the internal algorithm of the Processing Unit 114.

Once the request is received by the Processing Unit 114, in step 213 it sends a query to the Server Database 116 containing all necessary information on server conditions relating to the plurality of VPN Servers 120. The Server Database 116 contains data related to server conditions such as server location, server hub score, server time of creation and server load for the plurality of VPN Servers 120. The Server Database 116 contains data related to server conditions which are not limited to server location, server hub score, server time of creation and server load for the plurality of VPN Servers 120. The server conditions stored in the Server Database 116 are obtained by the Processing Unit 114 in step 215 through the database query.

After obtaining server conditions for the plurality of VPN servers 120, the Processing Unit 114 proceeds to calculate the numerical weights. The following explanations and algorithms are some of the exemplary methods of how the Processing Unit 114 computes the necessary numerical weights, and it may include various other mathematical methods as well.

To enable the calculation of the country weight, the API 106 forwards the IP address of the User device 102 to a third-party geolocation service in order to identify the country of the User Device 102. The third-party geolocation services have access to several databases containing geolocation information for numerous IP addresses. Through requesting the geolocation services, the API 106 is able to receive the country code or in other words information regarding the country of a particular User Device 102 is obtained. The API 106 forwards this information regarding the country of the User Device 102 to the internal memory of the Processing Unit 114. With this information the Processing Unit 114 is able to calculate one of the numerical weights known as the country weight. One must note that this information regarding the country of the User Device 102 is only used in the calculation of the country weight and is removed from the internal memory of the Processing Unit 114 as soon as the calculation is done.

Now, for calculating the country weight, the Processing Unit 114 assigns the numerical value '1' for all servers in the plurality of VPN Servers 120 that are not located in the country of the User Device 102. Conversely, the Processing Unit 114 assigns the numerical value '0' for all servers in the plurality of VPN Servers 120 that are located in the same country as the User Device 102. With this algorithm, the servers that are present in the same country will have lesser scores indicating the proximity to the User Device 102. Since this numerical weight is an indicator of the country location of the plurality of VPN Servers 120, these are termed as the country weights by the Processing Unit 114. The reason behind identifying the nearest server is that the connectivity is faster, and the chances of packet loss are reduced.

Next, with the hub score data, the Processing Unit 114 computes the hub weight for each server in the plurality of VPN Servers 120. This may be done through the following exemplary mathematical expression that may be configured in the Processing Unit. Therefore, the hub weight may be calculated as follows:

$$\text{Hub weight} = -(\text{country weight}) \times \text{hub score}$$

It is important to identify servers that are located in closer proximity to an international internet exchange hub because of reliability and speed in connectivity. Since the country weight is an element of $\{1,0\}$, the hub weight will in reality be of $\{-(\text{hub score}), 0\}$. Therefore, based on the above algorithm, the hub weight of a server on the international internet exchange hub with non-zero hub score and country weight, will be a non-zero value as well, while for local servers the hub weight value will be zero regardless of hub score.

The Processing Unit 114 computes the time weight using the data related to the server creation time. Each server in the plurality of the VPN Servers 120 has an attribute known as the time of creation or simply creation time. In order to use this attribute, the Processing Unit 114 converts the format of the creation time into Unix time format and normalizes it by using the following expression:

$$T(n) = (\text{creation time} - \max(\text{creation time}))/((\max(\text{creation time}) - \min(\text{creation time})))$$

Here, max(creation time) and min(creation time) are maximum and minimum values of creation of time within a given set of servers in the plurality of VPN Servers 120. With the normalized time $T(n)$, the Processing Unit 114 then computes time weight for each server in the plurality of VPN Servers 120 using the following exemplary expression:

$$\text{Time weight} = \beta(T(n) + \kappa)^\theta + \lambda$$

Here, $\beta$ is a multiplier constant, has the value of $-0.15$, $\kappa$ is a constant indicating the horizontal shift in creation time and has the value of 0.5 and $\lambda$ is a constant indicating the vertical shift in the creation time and is equal to 1. Furthermore, the exponent $\theta$ is known as the exponential constant in time penalty and has the value of 7. Therefore, substituting the values the exemplary time weight expression will be:

$$\text{Time weight} = -(0.15)(T(n) + 0.5)^7 + 1$$

Since the domain of the normalized time $T(n)$ is bound within the interval $\{0, 1\}$, therefore, the range of the time weight is bound within the interval $\{1, -1.562890625\}$. This means that the oldest server in a given set of the plurality of VPN Servers 120 will have a value of 1 whereas, for the most recently created server the value will be approximately $-1.56$. It is important to identify the servers that are created recently because they have less chances of being blocked and they are more likely to work in a restricted country. This method aids in identifying the servers that were created recently from among the plurality of VPN Servers 120.

Another factor is the rate at which each VPN server encounters a captcha, or the captcha rate, when the VPN server is used to access known target websites. According to some embodiments, the testing module 118 of the VPN Service Provider Infrastructure 104 prepares a request directed to one or more predefined service providers 121, for example, web services, and the service providers 121 employ captcha services to prevent attacks. The service providers 121 1, 121 2 . . . 121m represent multiple service providers, and may include, without limitation, service providers, such as, for example, GOOGLE INC. of Mountain View, California, AMAZON INC. of Seattle, Washington, among others. The request prepared by the testing module 118 is included, for example, in a message, such as an HTTP message, for the URL (or cURL) destination, and in some embodiments, the request is a randomized search request.

The request is sent by the testing module 118, using the network 122, to the aforesaid service providers 121 via one or more of the VPN servers 120, using exit IP addresses associated with each of the VPN servers 120. Each of the VPN servers 120 may have one or more exit IP addresses, up to 244 different addresses for example, achieved by employing the entire subnet, depending on the hardware configuration. The request is sent at predefined periodic time intervals or according to other schemes.

The testing module 118 receives responses from the predefined service providers 121 for each of the exit IP addresses used for each of the VPN servers 120. The responses may or may not include a captcha challenge. The responses from each of the predefined service providers 121 contain different predefined key values and different predefined hashes which indicate, for example, if a captcha has been encountered in such responses. Upon receipt of the responses, the testing module 118 analyses the headers and the payload of the responses for predefined key values and predefined hashes, respectively. If the testing module 120 recognizes the predefined key value or the predefined hash in the response received by the VPN server by the particular exit IP address as corresponding to a captcha challenge, then the testing module 120 provides the information to the server database 116 that the exit IP address used by the particular VPN server requires a captcha at the service provider, for example, such an exit IP address may be marked as a spam IP address by one or more service providers, and such IP addresses may also be referred to as compromised IP address(es). In some embodiments, the exit VPN server performs the analysis of the predefined headers and identifies whether one of its IP addresses has been identified as a compromised IP address.

The processing unit 114 receives the information from the server database 116 about the particular VPN server 120, the total number of exit IP addresses used by the VPN server and the number of exit IP addresses used by the VPN server 120 that are flagged. The processing unit 114 calculates the captcha rate for the particular VPN server as a fraction or a percent representing the number of exit IP addresses that are identified or determined as compromised IP addresses for the particular VPN server versus the total number of exit IP addresses for the particular VPN server. For example, if the VPN server has a total of 4 exit IP addresses, and 2 out of 4 are compromised IP addresses, the VPN server captcha rate is 0.5 (2/4) or 50%. In some embodiments, the captcha rate is used compute the captcha rate adjustment value, which is used along with the additional information on the VPN servers, for example, the additional information such as hub score and the like in an equation discussed below, to identify an optimal exit VPN server.

The captcha rate may be obtained from the server database 116, for example, based on the information provided to the server database 116 by the testing module 118, or in some embodiments, by the exit VPN server. Some service providers 121 flag an exit IP address for a limited duration, such as a few hours, and in such instances, more recent data regarding the flagged exit IP addresses is more relevant for the exit VPN server, as compared to captcha rates computed for time windows earlier than the recent time windows. Accordingly, in some embodiments, the VPN server captcha rate is obtained for a predefined and/or configurable recent time window, such as 30 minutes, 60 minutes, 90 minutes, 120 minutes, or any other predefined time window.

In some embodiments, the processing unit 114 provides all the VPN servers with captcha rate between 0 to about 0.5 (0-~50%) to the scoring engine 112, and does not provide the VPN servers having a captcha rate greater than about 0.5. Since a higher captcha rate indicates a high percentage of exit IP addresses of a VPN server as being compromised, if captcha challenge is an important factor, the VPN servers with higher captcha rates are excluded from the consideration to identify an optimal VPN server. In some embodiments however, factors other than captcha rate may take precedence, and even VPN servers with high captcha rates are included in the consideration to identify an optimal VPN server. Accordingly, the captcha rate adjustment value may be configured differently in different embodiments.

In some embodiments, where the captcha challenge is an important factor, the captcha rate adjustment value for a VPN server is calculated as the round value of the captcha rate, where the round value is 0 for a fraction equal to or smaller than about 0.5 and 1 for a fraction greater than about 0.5. In such embodiments, inclusion of the captcha rate adjustment value in calculation of a penalty score for the VPN servers will likely result in elimination of the servers having a captcha rate higher than about 0.5, that is, the captcha rate adjustment value of 1. While the captcha rate value of about 0.5 has been used as an example in embodiments where the captcha challenge is an important factor, other values may be used depending on desired tolerance level of encountering a captcha challenge, for example, captcha value of about 0.2, about 0.3 or the like.

In some embodiments where the captcha challenge is an important factor, the captcha rate adjustment value is calculated as 0 when the captcha rate is less than or equal to the desired fraction value (for example, about 0.5, about 0.2, or about 0.3 as above), and a large constant value if the captcha rate is above this desired fraction. For example, in some cases, the VPN server has a medium captcha rate (e.g. 0.5-0.75 (50-75%)), and in some embodiments, the captcha rate adjustment value is selected to be a constant larger than 1, for example, 5, 10, 15, or a random medium value that may be between, for example, 5 and 15. In some cases, the VPN server has a large captcha rate (for example, 0.75-1 (75-100%)), and in some embodiments, the captcha rate adjustment value is set to a constant larger than the constants selected for the medium captcha rates, and for example a large value such as 20, 30, or a large random value between, for example, 20 and 30, or a very large constant (e.g., 10,000) to effectively exclude the exit VPN server from being considered. The calculation of the captcha rate adjustment value may be configured according to the application, for example, if the encountering a captcha must be avoided, the high captcha rates generate a very high captcha rate adjustment value, versus where encountering the captcha challenge is mildly undesirable, the high captcha rates generate a captcha rate adjustment value of 1 or another smaller constant.

In some embodiments, where encountering captcha is not highly undesirable, the system is configured to include the VPN servers with medium range captcha rates (0.5-0.75), in addition to the VPN servers with low range captcha rates (0-0.5), to determine the optimal VPN server. In such embodiments, the captcha rate adjustment value is calculated as a round of the modulus value (that is, the positive value) of the captcha rate minus 0.25.

In some embodiments, where factors other than the avoidance of captcha challenge take precedence, on in some embodiments, if the scoring engine 112 cannot provide the optimal server for the particular user by selecting the optimal server from the list of VPN servers with captcha rate 0-0.5, the scoring engine 112 requests the processing unit 114 to provide the VPN servers with a captcha rate between 0 to about 0.75 (0-~75%). Further, if the scoring engine 112 cannot provide the optimal server for the particular user by selecting the optimal server from the list of VPN servers with captcha rate 0-0.75, the scoring engine 112 requests the processing unit 114 to provide all the VPN servers in order to select an optimal VPN server therefrom. In this manner, the captcha rates are determined and the VPN servers having desired captcha rate range(s) are identified.

One of the server conditions obtained from the Server Database 116 is the information about the server load for the plurality of VPN Servers 120. Each server in the plurality of VPN Servers 120 has an attribute called load and it represents the ratio of server capacity used and the theoretical maximum capacity of the server. Naturally, load of a server is quite volatile over time, this means obtaining information on server load is quite resource intensive and dynamical. However, at a particular point in time, the Processing Unit 114 uses the server load to compute the load weight for each of the servers in the plurality of VPN Servers 120. The exemplary expression for determining load weight is as follows:

Load weight=1;if server load>overload threshold

Load weight=0;if server load≤overload threshold

Here, the overload threshold is 80, it is determined by the Server Picker Infrastructure 110 and can be changed according to the nature and capacity of a server and the network. Through determining the load weight, the overload condition can be known for a particular server in the plurality of VPN Servers 120. The logic behind this algorithm is to identify servers that are not overloaded to service the User Device 102. One must note that the attribute of load is dynamic, and the unique feature of the current embodiment is that it is able to determine the load weight continuously at a regular time interval according to the changes in the server load.

All the above calculations of determining the several numerical weights for each server in the plurality of VPN Servers 120 are carried out by the Processing Unit 114 in step 217 and returns them to the Scoring Engine 112 in step 219 thereby satisfying the request made by the Scoring Engine in step 211. All data necessary for computing the numerical weights for each server are obtained from the Server Database 116. However, one must note that Testing Module 118 is responsible for testing and gathering the information related to several server conditions. These server conditions are then stored in the Server Database 116 arranged according to individual servers and later accessed by the Processing Unit 114.

The Scoring Engine 112 after receiving the necessary numerical weights for each server in the plurality of VPN Servers 120, it begins to compute the server penalty score. In step 221, the server penalty score in calculated by the following exemplary expression:

> server penalty score=country weight+hub weight+ time weight+load weight+captcha rate adjustment value+random value In some embodiments, if the penalty score is greater than 0 without the inclusion of captcha rate adjustment value, then the captcha rate adjustment value is not used in calculating the server penalty score. In such embodiments, the VPN servers already penalized due to other factors are not penalized further due to captcha challenge (compromised IP address).

That is, in order to calculate the server penalty score of a server in the plurality of VPN Servers 120, the Scoring Engine 112 adds the different numerical weights of that particular server along with the random value. The random value is significantly a small numerical value in the interval [0, 0.001] and is calculated by the Scoring Engine 112 using the random value seed. The seed for this random value can be generated through combining multiple attributes, server conditions, and other properties. The main purpose of the random value is to avoid coincidences of server penalty score values. Exemplary values that are used for the random value seed may include server IDs, Unix time value, client application IDs. Here, the client application ID denotes a randomly generated number during the installation of the VPN client application in the user device. Thus, the exemplary expression for generating the random value seed for determining the random value is as follows:

> random value seed=(server ID+client application ID+unix time)

The random value is calculated using the above generated seed by the Scoring Engine 112. Therefore, the exemplary expression for calculating the random value is as follows:

> random value=(random value seed)/1000
>
> i.e., random value=(server ID+client application ID+unix time)/1000

After calculating the server penalty score in the above manner for each server in the plurality of VPN Servers 120, the Scoring Engine 112 in step 223 arranges the IP addresses of the plurality of VPN Servers 120 according to the server penalty score in an ascending order. In step 225, the Scoring Engine 112 identifies the optimal server form the scored list of servers. The server with the lowest server penalty score is the optimal server and in step 227 the Scoring engine 112 provides the IP address of the optimal server to the API 106. In step 229, the API 106 forwards the IP address of the optimal server to the User Device 102 and in step 231 the User Device 102 establishes the encrypted VPN connection with the optimal server from among the plurality of VPN Servers 120.

Embodiments disclosed herein relate to the field of methods and systems for identifying and connecting to an optimal server consistently from among a plurality of servers. Generally, the embodiments are related to virtual private network (VPN) technologies featuring a dynamic logical system that enables VPN applications to identify and establish a connection with an optimal server form among the plurality of VPN servers. Moreover, the disclosure presents methods and systems for efficiently evaluating and scoring a plurality of VPN servers. However, it is to be noted that the embodiments are relatable and functionable to other like applications where there is a need for identifying an optimal server from among a plurality of servers.

Figure 3:
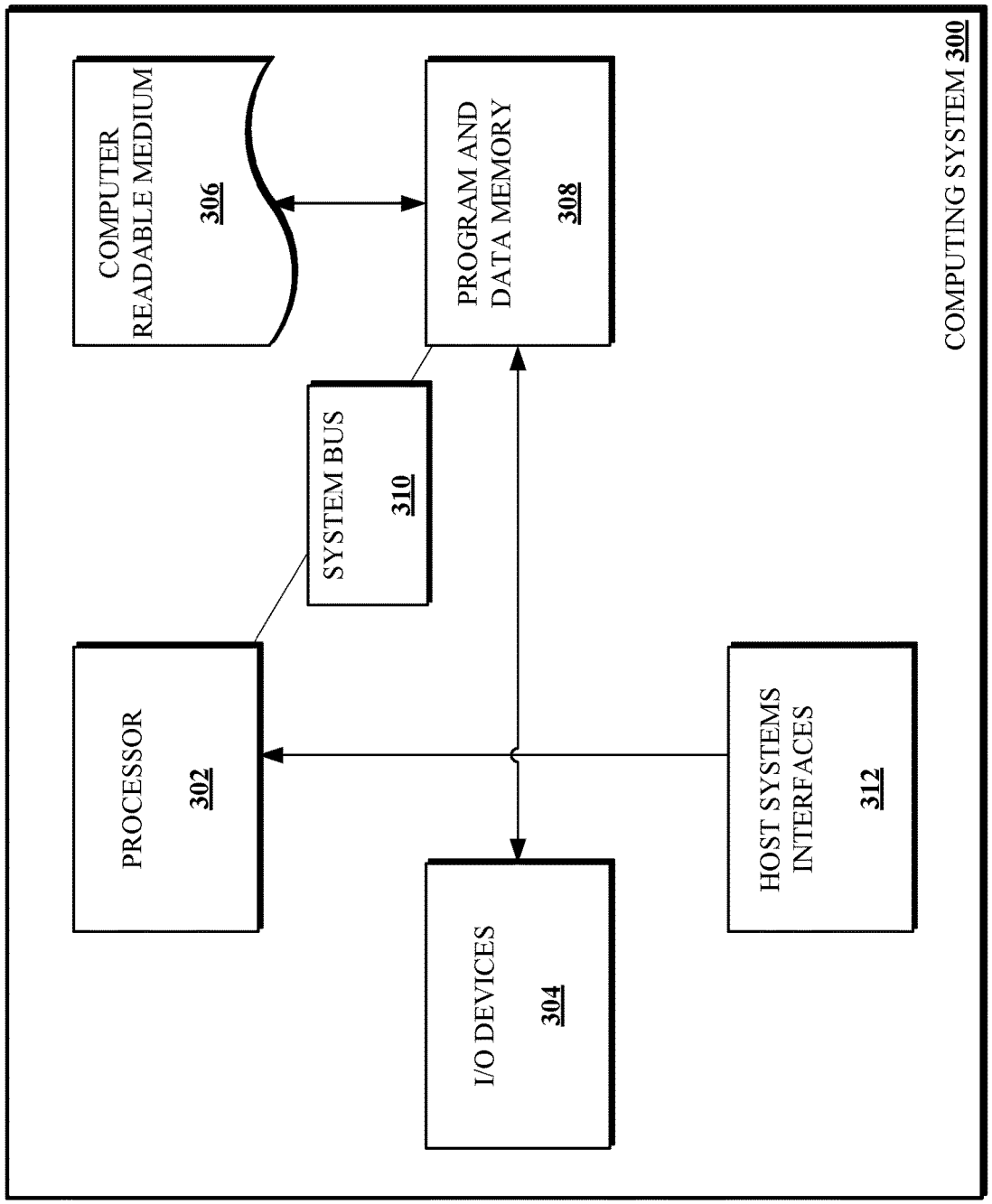
FIG. 3 shows a computing system in which a computer readable medium may provide instructions for performing any of the methods and processes disclosed herein.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 3 illustrates a computing system 300 in which a computer readable medium 303 may provide instruction for performing any methods and processes disclosed herein.

Furthermore, some aspects of the embodiments herein can take the form of a computer program product accessible from the computer readable medium 306 to provide program code for use by or in connection with a computer or any instruction execution system. For the purposes of this description, the computer readable medium 306 can be any apparatus that can tangibly store the program code for use by or in connection with the instruction execution system, apparatus, or device, including the computing system 300.

The computer readable medium 306 can be any non-transitory tangible electronic, magnetic, optical, electromagnetic, infrared, or semiconductor system (or apparatus or device). Some examples of a computer readable medium 306 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 300 can include one or more processors 302 coupled directly or indirectly to memory 308 through a system bus 310. The memory 308 can include local memory employed during actual execution of the program code, bulk storage, and/or cache memories, which provide temporary storage of at least some of the program code in order to reduce the number of times the code is retrieved from bulk storage during execution.

Input/output (I/O) devices 304 (including but not limited to keyboards, displays, pointing devices, I/O interfaces, etc.) can be coupled to the computing system 300 either directly or through intervening I/O controllers. Network adapters may also be coupled to the computing system 300 to enable the computing system 300 to couple to other data processing systems, such as through host systems interfaces 312, printers, and/or storage devices through intervening private or public networks. Modems, cable modems, and Ethernet cards are just examples of network adapter types.

The disclosure presents a method for identifying an optimal server from among a plurality of VPN servers in a VPN network. The method comprises receiving, at a VPN service provider from a user device, request for connection to an optimal server; obtaining, at the testing module the necessary information about server condition that are used in calculating the server penalty score; storing, at the server database the information that are obtained by the testing module pertaining to the several server condition; calculating, at the server picker infrastructure (SPI) the server penalty score for each server in the given set of VPN servers; arranging, at the server picker infrastructure (SPI) the servers according to the calculated sever penalty score; identifying, at the server picker infrastructure (SPI) the optimal server based on the least server penalty score; sending from the server picker infrastructure the IP address of the identified optimal server through the VPN service provider to the user device.

The method for dynamically calculating and determining the several numerical weights and server penalty score for each server in the plurality of VPN servers.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, a singular or plural form can be used, but it does not limit the scope of the disclosure and the same teaching can apply to multiple objects, even if in the current application an object is referred to in its singular form.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A method, comprising:
   receiving a request from a user device;
   calculating, in response to the request, respective penalty scores for VPN servers, wherein at least some of the VPN servers are associated with respective exit internet protocol (IP) addresses, and wherein a respective penalty score for a VPN server is calculated based on a ratio of the respective exit IP addresses determined as being compromised;
   selecting one or more of the VPN servers based on the respective penalty scores; and
   sending respective IP addresses of the one or more of the VPN servers to the user device.

2. The method of claim 1, further comprising:
   determining that an exit IP address is compromised based on a rate of captcha challenges encountered by the exit IP address.

3. The method of claim 1, wherein the respective penalty scores for the VPN servers are further calculated based on a location of the user device.

4. The method of claim 3, further comprising:
   sending a request for the location to a geolocation service, wherein the request includes at least an IP address of the user device; and
   receiving the location of the user device in response to the request.

5. The method of claim 3, wherein the respective penalty scores for the VPN servers are further calculated based on respective proximities of the VPN servers to the user device.

6. The method of claim 1, wherein the respective penalty scores for the VPN servers are further calculated based on respective times of creation of the VPN servers wherein a first VPN server having a first creation time that is earlier in time than a second creation time of a second VPN server is assigned a higher weight than the second VPN server.

7. The method of claim 6, further comprising:
   excluding, from the one or more of the VPN servers, VPN servers having ratios of compromised exit IP addresses that are below a predefined threshold.

8. A non-transitory computer readable medium storing instructions operable to cause one or more processors to perform operations comprising:
   receiving a request from a user device;
   calculating, in response to the request, respective penalty scores for VPN servers, wherein at least some of the VPN servers are associated with respective exit internet protocol (IP) addresses, and wherein a respective penalty score for a VPN server is calculated based on a ratio of the respective exit IP addresses determined as being compromised;
   selecting one or more of the VPN servers based on the respective penalty scores; and
   sending respective IP addresses of the one or more of the VPN servers to the user device.

9. The non-transitory computer readable medium of claim 8, wherein the operations further comprise:
   determining that an exit IP address is compromised based on a rate of captcha challenges encountered by the exit IP address.

10. The non-transitory computer readable medium of claim 8, wherein the respective penalty scores for the VPN servers are further calculated based on a location of the user device.

11. The non-transitory computer readable medium of claim 10, wherein the operations further comprise:
sending a request for the location to a geolocation service, wherein the request includes at least an IP address of the user device; and
receiving the location of the user device in response to the request.

12. The non-transitory computer readable medium of claim 10, wherein the respective penalty scores for the VPN servers are further calculated based on respective proximities of the VPN servers to the user device.

13. The non-transitory computer readable medium of claim 8, wherein the respective penalty scores for the VPN servers are further calculated based on respective times of creation of the VPN servers wherein a first VPN server having a first creation time that is earlier in time than a second creation time of a second VPN server is assigned a higher weight than the second VPN server.

14. The non-transitory computer readable medium of claim 13, wherein the operations further comprise:
excluding, from the one or more of the VPN servers, VPN servers having ratios of compromised exit IP addresses that are below a predefined threshold.

15. A device comprising:
a memory; and
a processor, the processor configured to execute instructions stored in the memory to:
receive a request from a user device;
calculate, in response to the request, respective penalty scores for VPN servers, wherein at least some of the VPN servers are associated with respective exit internet protocol (IP) addresses, and wherein a respective penalty score for a VPN server is calculated based on a ratio of the respective exit IP addresses determined as being compromised;
select one or more of the VPN servers based on the respective penalty scores; and
send respective IP addresses of the one or more of the VPN servers to the user device.

16. The device of claim 15, wherein the processor is further configured to execute instructions stored in the memory to:
determine that an exit IP address is compromised based on a rate of captcha challenges encountered by the exit IP address.

17. The device of claim 15, wherein the respective penalty scores for the VPN servers are further calculated based on a location of the user device.

18. The device of claim 17, wherein the processor is further configured to execute instructions stored in the memory to:
send a request for the location to a geolocation service, wherein the request includes at least an IP address of the user device; and
receive the location of the user device in response to the request.

19. The device of claim 17, wherein the respective penalty scores for the VPN servers are further calculated based on respective proximities of the VPN servers to the user device.

20. The device of claim 15, wherein the respective penalty scores for the VPN servers are further calculated based on respective times of creation of the VPN servers wherein a first VPN server having a first creation time that is earlier in time than a second creation time of a second VPN server is assigned a higher weight than the second VPN server.

* * * * *